United States Patent [19]
Ravichandran

[11] Patent Number: 6,035,120
[45] Date of Patent: Mar. 7, 2000

[54] METHOD AND APPARATUS FOR CONVERTING EXECUTABLE COMPUTER PROGRAMS IN A HETEROGENEOUS COMPUTING ENVIRONMENT

[75] Inventor: Hari K. Ravichandran, Sunnyvale, Calif.

[73] Assignee: Sun Microsystems, Inc., Palo Alto, Calif.

[21] Appl. No.: 08/865,335

[22] Filed: May 28, 1997

[51] Int. Cl.[7] .................................................. G06F 9/40
[52] U.S. Cl. ............................................................ 395/705
[58] Field of Search ..................................... 395/705, 707, 395/500, 200.32, 200.54, 500.04, 708

[56] References Cited

U.S. PATENT DOCUMENTS

| | | | |
|---|---|---|---|
| 5,524,253 | 6/1996 | Pham et al. | 395/200.32 |
| 5,560,013 | 9/1996 | Scalzi et al. | 395/705 |
| 5,577,231 | 11/1996 | Scalzi et al. | 395/500 |
| 5,724,590 | 3/1998 | Goettelmann et al. | 395/707 |
| 5,761,486 | 6/1998 | Watanabe et al. | 395/500 |
| 5,790,425 | 8/1998 | Wagle | 1/1 |
| 5,812,780 | 9/1998 | Chen et al. | 395/200.54 |

OTHER PUBLICATIONS

H.A. Rizvi, et al. "Execution–Driven Simulation of a Superscalar Processor", IEEE; 1994; pp. 185–204.

Wayne Yamamoto, et al. Performance Estimation of Multistreamed, Superscalar Processors: IEEE 1994; pp. 195–204.

*Primary Examiner*—Tod R. Swann
*Assistant Examiner*—Matthew Smithers
*Attorney, Agent, or Firm*—Sierra Patent Group, Ltd.

[57] ABSTRACT

A method and apparatus for converting a source executable code generated for execution on a source processor into a target executable code for execution on a target processor is provided. Typically, the following sequence of steps are performed on a computer for each instruction in the source executable code. Initially, a source instruction is selected from the source executable code. This source instruction typically has an opcode and one or more corresponding parameters used by the opcode during execution. Next, the source instruction opcode is used to isolate one or more corresponding parameters within the source instruction. After this is completed, one or more target instructions associated with the target processor are located which correspond to the source instruction. Then, a target instruction is generated by filling the one or more parameters isolated from the source instruction into the corresponding parameter locations in the one or more target instructions.

18 Claims, 6 Drawing Sheets

METHOD AND APPARATUS FOR CONVERTING EXECUTABLE COMPUTER PROGRAMS IN A HETEROGENEOUS COMPUTING ENVIRONMENT

RELATED APPLICATIONS

This application is related to U.S. Application Ser. No. 08/864,655, filed May 28, 1997, entitled "METHOD AND APPARATUS FOR DYNAMICALLY OPTIMIZING AN EXECUTABLE COMPUTER PROGRAM USING INPUT DATA", Attorney Docket No. 82225.2017, and naming Hari Ravichandran as inventor, and U.S. Application Ser. No. 08/864,247, filed May 28, 1997, entitled "METHOD AND APPARATUS FOR GENERATING AN OPTIMIZED TARGET EXECUTABLE COMPUTER PROGRAM USING AN OPTMIZED SOURCE EXECUTABLE", Attorney Docket No. 82225.2134, and naming Hari Ravichandran as inventor, both of which are assigned to the assignee of the present invention and are herein incorporated, in their entirety, by reference.

FIELD OF THE INVENTION

The present invention relates to computer compilers and interpreters. In particular, this invention relates to generating executables which can execute in a heterogeneous computing environment.

BACKGROUND OF THE INVENTION

In an open computing environment, most software applications are usually available on a wide variety of hardware platforms. Generally, software applications written using open computing standards such as C, C++ and JAVA can be ported to several different hardware platforms with very little effort. In fact, applications written entirely in the architecturally neutral programming language JAVA require no actual porting and are categorized uniquely as "Write Once, Run Anywhere"[1]. Increased portability of software applications means that computer hardware manufacturers can no longer leverage computer hardware sales on the exclusive availability of software applications. Consequently, a great number of computer manufacturers base their computer sales purely on computer hardware performance. In the end, these computer manufacturers compete to offer more processing power at increasingly lower costs.

[1]. Write Once, Run Anywhere is a trademark of Sun Microsystems, Inc. in the United States and other countries. Write ONCE, Run Anywhere est une marque de fabrique ou une marque déposée de Sun Microsystems, Inc. aux Etats-Unis et dans d'autres pays.

Users generally compare benchmark results, such as SPECint or SPECfp, to determine which computing platform offers the best price-performance. In most cases, the computer manufacturers compile these benchmarks, execute them on their computers, and publish the results for each of their respective computing hardware platforms. Often, users will select a particular hardware platform based entirely on the performance results of these benchmarks. Open computing standards enable users to mix and match the best price-performance hardware solution in each performance class to create a robust and economical heterogeneous network.

The importance of these benchmarks is underscored by the amount of research and development spent on optimizing compilers. Many computer manufacturers increase the performance ratings on their product line by improving the optimizer in a compiler rather than improving the underlying hardware platform. Benchmarks run through the optimizer run faster on the same hardware platforms by streamlining the executable code and reducing the total number of clock-cycles per instruction (CPI) required to execute the benchmark.

Unfortunately, the user may discover after purchasing a particular hardware platform that the benchmark results do not translate into the higher overall expected performance characteristics. In some cases, a lower performing hardware solution may appear to have a better execution profile because of very sophisticated optimization techniques. Current benchmarking techniques do not enable the user to distinguish between highly optimized benchmarks and truly high performing hardware platforms.

What is needed is a reliable technique for users and others to generate executables such as benchmarks which can execute in a heterogeneous computing environment. Preferably, these benchmarks are substantially similar and can be used to provide dependable performance information on the different hardware platforms they are executed on.

SUMMARY OF THE INVENTION

According to principles of the invention, a method and apparatus for converting a source executable code generated for execution on a source processor into a target executable code for execution on a target processor is provided. Typically, the following sequence of steps are performed on a computer for each instruction in the source executable code. In one embodiment, a source instruction is initially selected from the source executable code. This source instruction typically has an opcode and one or more corresponding parameters used by the opcode during execution. Next, the source instruction opcode is used to isolate one or more corresponding parameters within the source instruction. After this is completed, one or more target instructions associated with the target processor are located which correspond to the source instruction. Then, a target instruction is generated by filling the one or more parameters isolated from the source instruction into the corresponding parameter locations in the one or more target instructions. The target instruction is capable of being executed on a target computer platform.

In another embodiment of the invention, one or more target instructions are located using a conversion table. This conversion table maps each valid instruction associated with the source processor to one or more valid and functionally equivalent instructions associated with the target processor. Initially, the source instruction is located in the conversion table based upon the opcode portion of the source instruction. Next, the source instruction is mapped into one or more target instructions based on the association between the source instructions and target instructions in the conversion table.

DETAILED DESCRIPTION

Figure 1:
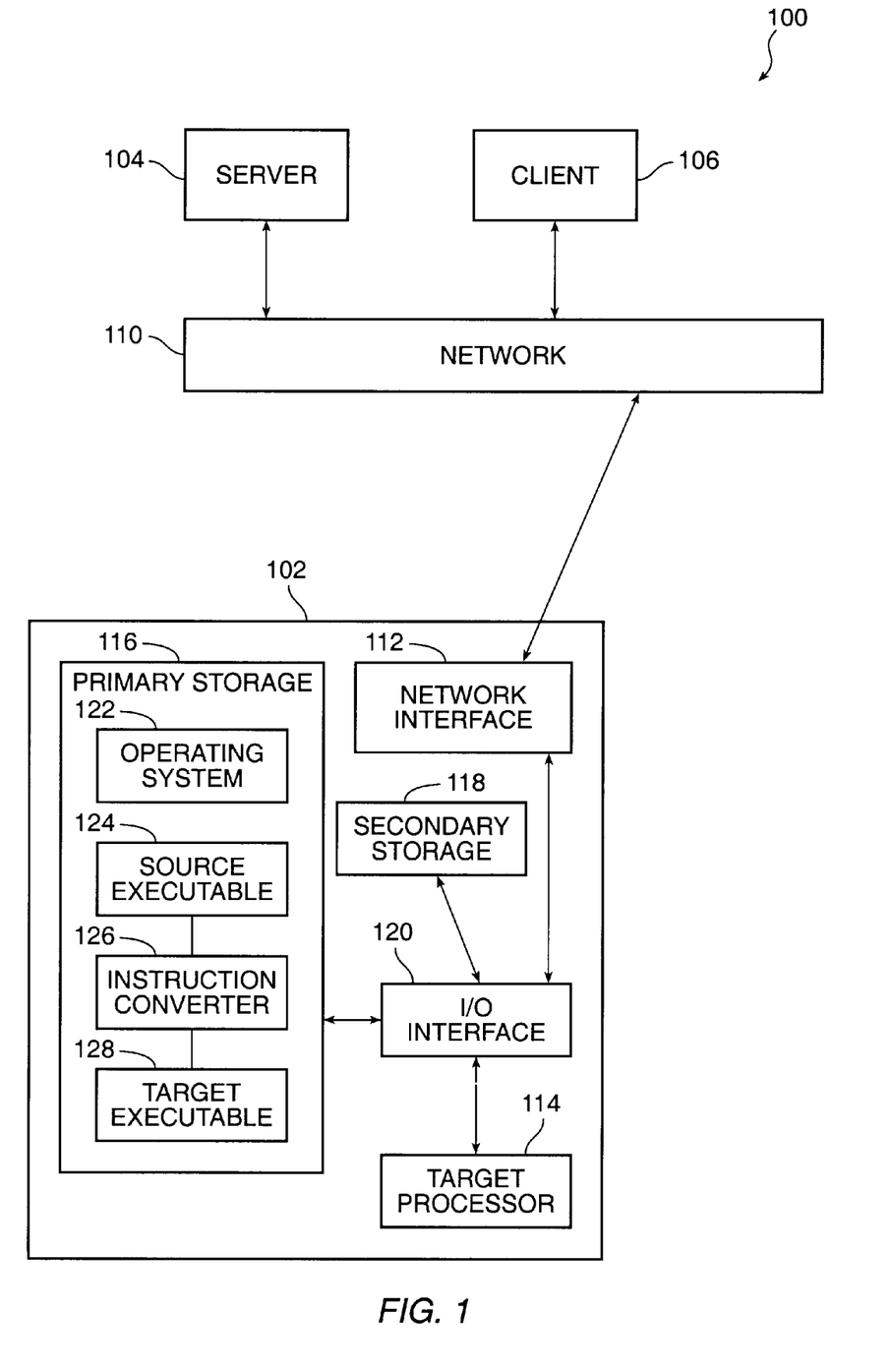
FIG. 1 illustrates a computer network for practicing one embodiment of the present invention.

FIG. 1 illustrates a computer network 100 for practicing one embodiment of the present invention. Computer network 100 includes server computer systems 102 and 104 configured to communicate with a client computer system 106 over a network 110. In one embodiment, the client and server computer systems coupled to this network transmit information utilizing the TCP/IP protocol. Other network protocols such as SNA, X.25, Novell Netware[1], Vines, or AppleTalk can also be used to provide similar client-server communication capabilities.

1. Netware is a registered trademark of Novell, Inc. in the United States and other countries.

Server 102 includes a network interface 112, a target processor 114, a primary storage 116, a secondary storage 118, and an I/O (input output) interface 120 which facilitates communication between these aforementioned elements. Network interface 112 couples server 102 to network 110 and facilitates communication between server 102 and other computers on the network 110.

Typically, target processor 114 on server 102 fetches computer instructions from primary storage 116 through I/O interface 120. After retrieving these instructions, target processor 114 executes these the computer instructions. Executing these computer instructions enables target processor 114 to retrieve data or write data to primary storage 116, secondary storage 118, display information on one or more computer display devices (not shown), receive command signals from one or more input devices (not shown), or retrieve data or write data to other computer systems coupled to network 110 such as server 104, and client 106. Those skilled in the art will also understand that primary storage 116 and secondary storage 118 can include any type of computer storage including, without limitation, randomly accessible memory (RAM), read-only-memory (ROM), and storage devices which include magnetic and optical storage media such as CD-ROM. In one embodiment, target processor 114 can be any of the SPARC compatible processors, UltraSPARC compatible processors or Java compatible processors available from Sun Microsystems, Inc. of Mountain View, Calif. Alternatively, target processor 114 can be based on the PowerPC processor available from Apple, Inc. of Cupertino, Calif., or any of the Pentium or x86 compatible processors available from the Intel Corporation or other corporations such as AMD, and Cyrix.

Primary storage 116 includes an operating system 122 for managing computer resources. In one embodiment, this operating system is the Solaris operating system or any operating system with support for object oriented programming languages such as the Java programming language or high level programming languages such as C. Also included in primary storage 116 is a source executable 124 generated for execution on a source processor, an instruction converter 126 designed in accordance with the present invention, and a target executable 128 generated after processing source executable 124 through instruction converter 126.

Figure 2:
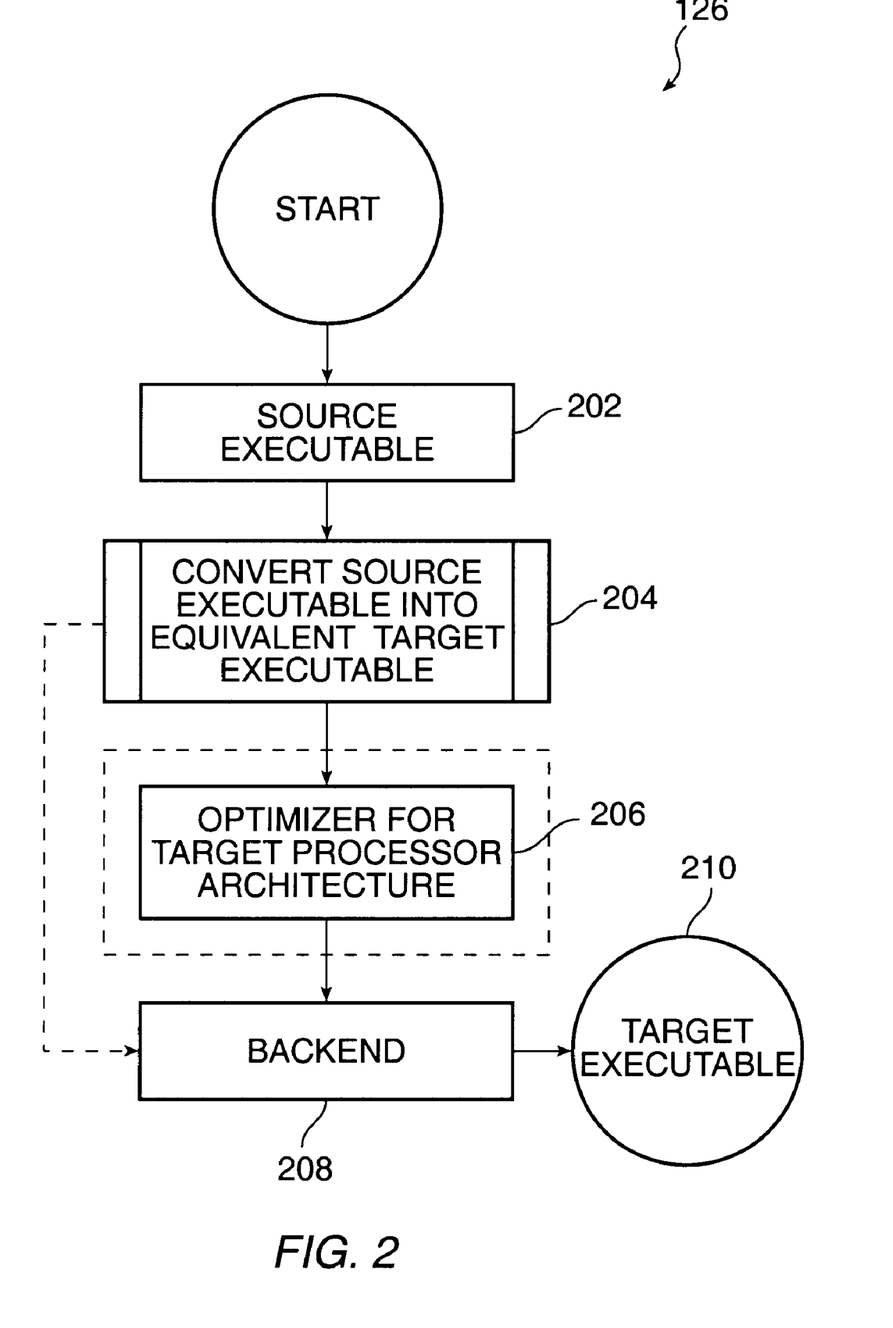
FIG. 2 is a flowchart illustrating the overall processing performed by an instruction converter.

FIG. 2 is a flowchart illustrating the overall processing performed by one embodiment of instruction converter 126. Instruction converter 126 typically accepts source executable 124 (FIG. 1) at step 202 in FIG. 2 for conversion into a target executable 128 (FIG. 1) suitable for execution on target processor 114. Optionally, these instructions are then processed through an optimizer at step 206 which improves the efficiency and execution time of the converted code. An optimizer useful in one embodiment is described in greater detail in U.S. patent application Ser. No. 08/864,655 entitled "METHOD AND APPARATUS FOR DYNAMICALLY OPTIMIZING AN EXECUTABLE COMPUTER PROGRAM USING INPUT DATA", naming Hari Ravichandran the inventor, herein incorporated by reference in its entirety, assigned to the assignee of the present invention, and filed on even date herewith with Attorney docket No. 82225.P2017. Typically, the optimizer would be used if the user wants an executable to take advantage of specific hardware features peculiar to a particular hardware platform. Using an optimizer improves the execution efficiency of an executable and increases the effective processing throughput of the hardware platform. Alternatively, the optimizer may be omitted if a user wishes to generate a substantially similar executable for comparing and contrasting performance on several different processors.

Referring to FIG. 2, at step 208 a backend process receives the converted instructions from the optimizing step 206, or conversion step 204 if the optional optimization step is not performed, and generates target executable 128 (FIG. 1) for execution on target processor 114. This step typically includes details associated with converting the target executable from architecturally neutral instructions into instructions specific to the target processor.

Embodiments of the present invention are concerned with a novel technique for converting executables in accordance with step 204 in FIG. 2. Essentially, step 204 converts a source executable code generated for execution on a source processor into a target executable code for execution on a target processor such as target processor 114 (FIG. 1).

Figure 3:
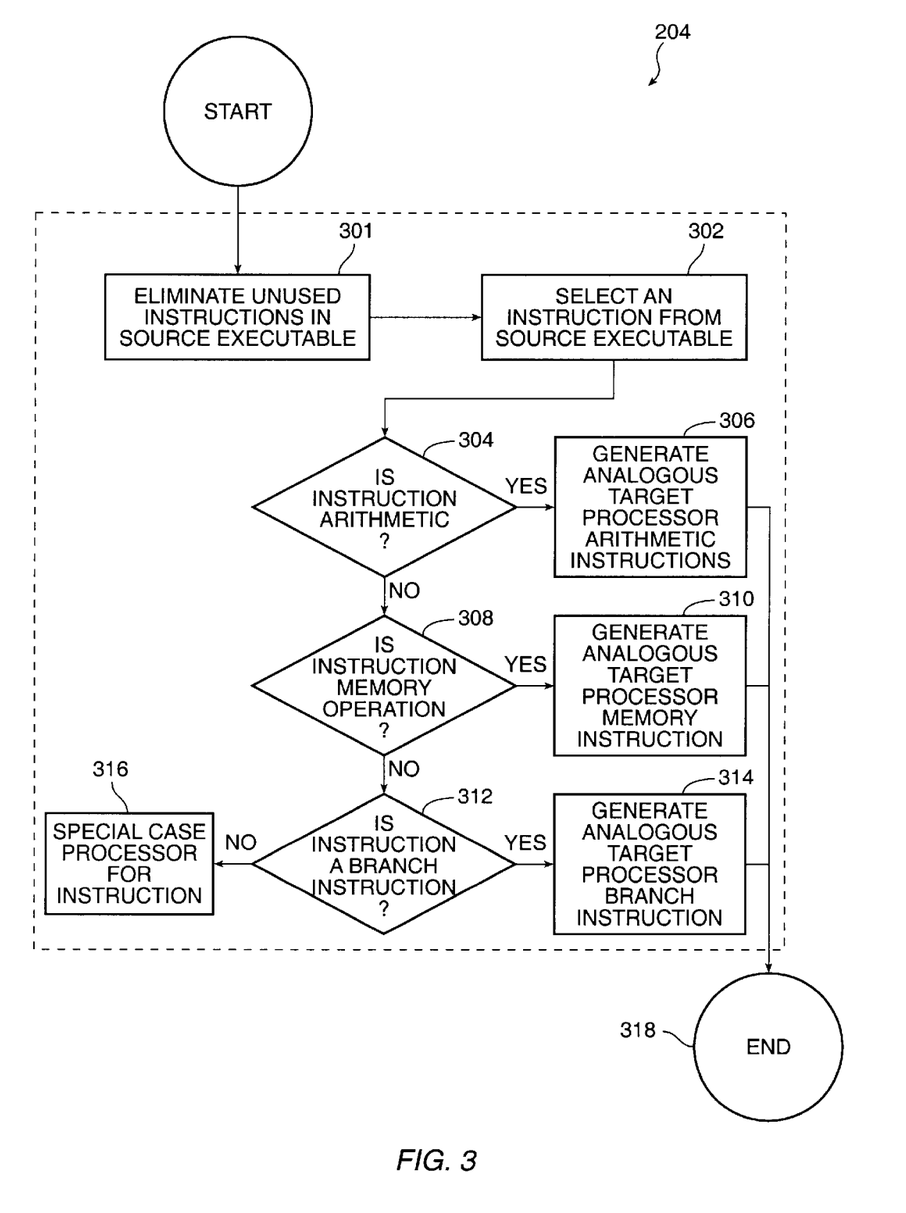
FIG. 3 is a block diagram indicating the overall steps used by one embodiment of the present invention to convert an executable program for execution on a different processor.

Initially, the user provides one embodiment of the present invention with a source executable program which is to be converted into a target executable program for execution on a target processor. To complete the conversion, one embodiment of the present invention performs the steps shown in FIG. 3 on each instruction in the source executable program. Referring to FIG. 3, step 301 begins by eliminating instructions in the source executable which are not going to be executed during runtime. In one embodiment, a dynamic simulation of the source executable using a simulator and a profiler, such as "iprof" and "gprof" available on UNIX and other platforms, will indicate which instructions in a given executable are not executed given a particular input data. For example, a dynamic simulator can simulate the logic flow in an executable given a particular input data set. In turn, a profiler can be used to determine which instructions in the executable are not going to be executed and should be excluded from execution. This step improves performance of the conversion process and the target executable program by eliminating, rather than processing, any unused instructions.

After eliminating unused instructions, step 302 in FIG. 3 selects a source instruction from the remaining instructions in the source executable program. In one embodiment, each instruction is processed sequentially in program order to maintain the original organization of the source executable code. Those skilled in the art will understand that locating the source instructions typically involves analyzing the header information of the source executable to determine the location of the text segment and the instructions.

Next, decision steps 304, 308, and 312 determine what type of operation is being performed by the current source instruction. Typically, these steps determine the instruction type by inspecting an opcode portion of the instruction and comparing the opcode value with the values in a conversion table used in one embodiment of the present invention. This conversion table contains mapping information used to categorize and convert different types of instructions executable on the source processor. Generally, the instruction format specifications and opcode values used to create the conversion table are publicly available and supplied by the computer processor manufacturer at little or no cost.

In one embodiment, the opcodes associated with the source processor are categorized as arithmetic operations, memory operations, or branch operations. If the instruction is an arithmetic operation, processing transfers from decision step 304 to step 306 where a corresponding target arithmetic instruction (or instructions) is generated for use in the target executable. Similarly, if the instruction is a memory operation, processing transfers from decision step 304 to decision step 308 and then to step 310 where a corresponding target memory instruction (or instructions) is generated for use in the target executable. Further, if the instruction is a branch operation, processing transfers through decision step 304, decision step 308, decision step 312 and then to step 314 where a corresponding target branch instruction (or instructions) is generated for use in the target executable. However, if an instruction can not be categorized as such, control passes to step 316 where the technique handles converting the instruction as a special case. In general, the categories are used to improve performance of the overall conversion process and simplifies the parsing required in later steps. Categorizing these instructions also improves the overall accuracy of the conversion process by guiding various type checking and error checking performed later in the process.

In the discussions which follow the conversion process used by one embodiment of the present invention is discussed in further detail. Although the discussion below relates more closely to RISC (reduced instruction set computing) processors, similar techniques and concepts can also be adapted to work with other processor technologies such as CISC (complex instruction set computing), VLIW (very large instruction word) and other processor types. Accordingly, the particular instructions and parameters discussed below are exemplary and should not be construed as a limitation to embodiments of the present invention.

Figure 4:
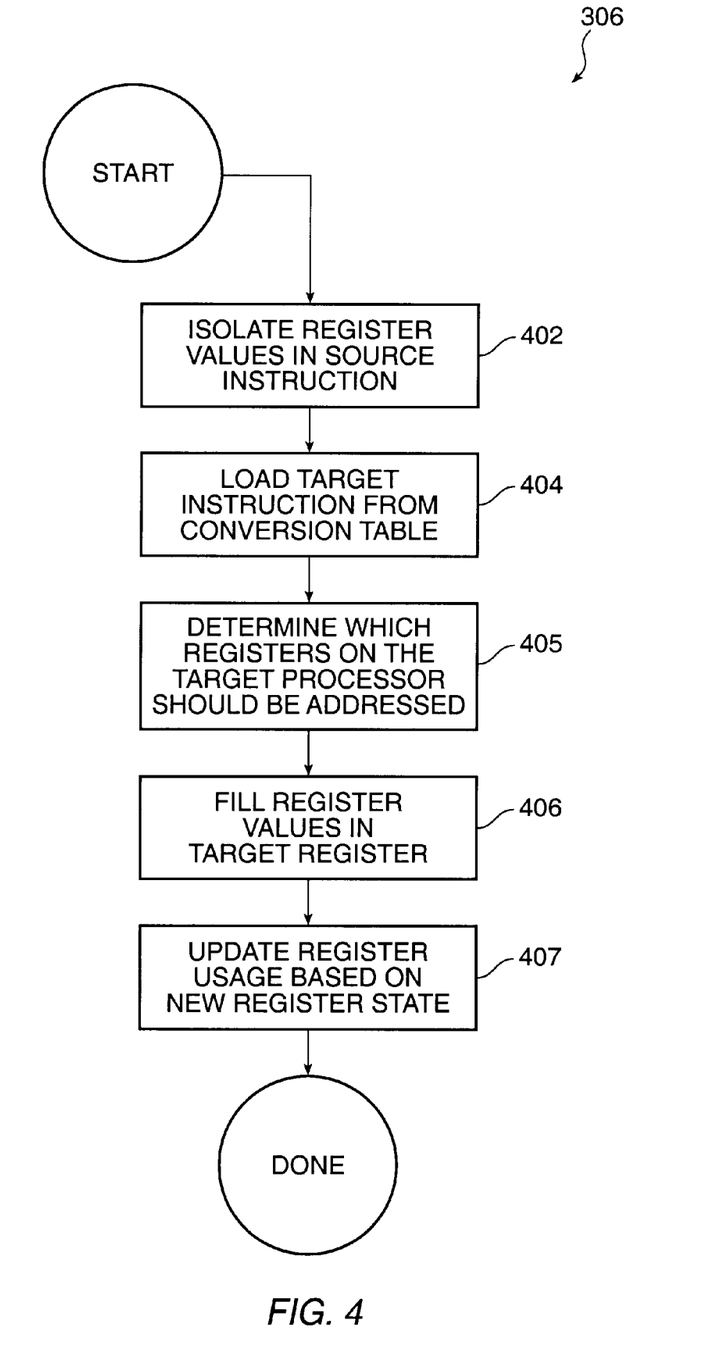
FIG. 4 is a flowchart which details the additional steps associated with converting an arithmetic instruction from a source executable into an arithmetic instruction for a target executable.

FIG. 4 is a flow chart which details the additional steps associated with converting an arithmetic instruction at step 306 (FIG. 3) from the source executable into an arithmetic instruction for the target executable. Initially, step 402 in FIG. 4 isolates the one or more register values used to perform the arithmetic operation on the source processor. This typically involves looking up the specific opcode in an instruction table associated with the source processor and then using the instruction format information to extract the appropriate register values. These register values are used later to generate the corresponding target instruction.

Next, step 404 locates one or more target instructions associated with the target processor which corresponds to the arithmetic source instruction found in step 306 (FIG. 3). In one embodiment, this step looks up the arithmetic source instruction in the conversion table and maps each instruction associated with the source processor to one or more valid instructions associated with the target processor. The predetermined conversion table is created by associating each valid instruction on the source processor with one or more instructions executable on the target processor which collectively and functionally perform the equivalent operation. Accordingly, step 404 replaces the arithmetic source instruction with one or more appropriate target instructions as guided by the conversion table.

Step 405 is used to keep track of the available registers in the target processor. This typically means that the register in the target executable is available and is of the correct type. In one embodiment, step 405 performs live register analysis and data flow analysis to determine how certain registers will be used by upcoming instructions. This is useful when the optimizer performs optimizations involving registers such as speculation and loop unrolling. In addition to live register analysis, this technique uses a register renaming scheme to map registers used in the source executable and registers used in the target executable program. Register renaming is helpful if there is not a one to one correspondence between registers on the source processor and registers available on the target processor. The actual register renaming is usually implemented using a table indicating whether a particular register is in use or available for use. For example, generally a floating point register used in the source executable is mapped to a floating point register in the target executable. A register rename table keeps track of the available registers and maps the source processor register to a corresponding target processor register which is the proper floating point type.

At step 406, generation of the target instructions are completed by filling register values isolated in step 402 into the appropriate instruction locations. For example, this step would extract the value stored in a floating point register used in the source executable and copy the value into the floating point register used in the target executable. In addition, this step can also be used to insert a reference into a target executable instruction which then references the floating point register used in the target processor. As discussed above, the use of registers in source and target arithmetic instructions is exemplary and included only because they typically are used in RISC type processors such as SPARC or the PowerPC. In an alternative embodiment, generating an arithmetic instruction in accordance with the present invention could also be adapted to other architectures which operate directly or indirectly on memory locations rather than registers.

After registers on the target executable are allocated and filled, step 407 updates register usage. In one embodiment, register usage is tracked by updating one or more entries in the register renaming table discussed above. These register renaming entries reflect which registers have been allocated, which registers are available, and the instructions using each of the different registers. Each time an instruction is finished using a particular register, the entries in the register renaming table are updated. Those skilled in the art will understand that careful allocation and deallocation of registers on the target processor is important to processing instructions efficiently on the target processor. Consequently, embodiments of the present invention contemplate using any technique for improving allocation, deallocation, and tracking of registers which would make register usage more efficient.

Figure 5:
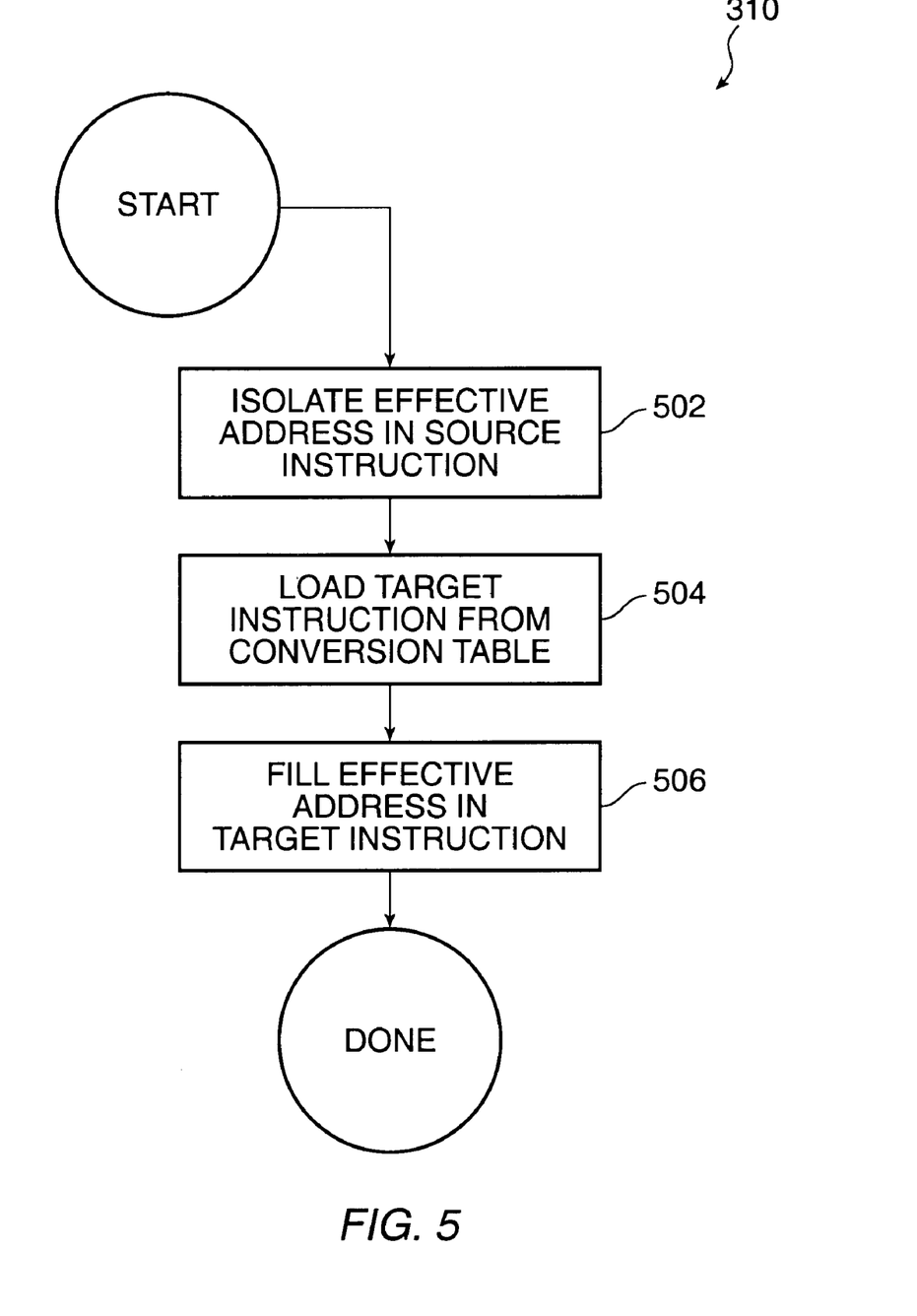
FIG. 5 is a flowchart which details the additional steps associated with converting a memory instruction from a source executable into a memory instruction for a target executable.

FIG. 5 is a flow chart which details the additional steps associated with converting a memory instruction for the source executable at step 310 (FIG. 3) into a memory instruction for the target executable. The process for converting memory instructions is similar to the process above used for converting arithmetic instructions except that the parameters used in memory type instructions typically reference memory addresses rather than register values. Generally, on a RISC processor, memory instructions are used to load registers on a processor which are used in turn to perform arithmetic, graphic, and other operations.

Initially, step 502 in FIG. 5 isolates the one or more memory addresses used to perform the memory instruction on the source processor. This typically involves looking up the specific opcode in an instruction table associated with the source processor and then using the instruction format information to extract the appropriate memory addresses. If an indexed memory instruction is being used, this memory location value is translated into an effective address or real address located in memory. In one embodiment, this is performed by summing the address in the source instruction with value stored in an index register associated therewith. The effective memory address is used later to generate the corresponding target instruction.

Next, step 504 locates one or more target instructions associated with the target processor which corresponds to the memory source instruction found in step 310 (FIG. 3). In one embodiment, this step looks up the memory instruction from the source executable in the conversion table which maps each instruction available on the processor to an equivalent functional instruction on the target processor. This conversion table was also previously discussed above. Accordingly, step 504 replaces the memory instruction from the source executable with one or more appropriate target instructions as indicated by this conversion table. At step 506, the memory target instructions are completed by inserting the effective memory addresses isolated in step 502 into the appropriate parameter locations.

Figure 6:
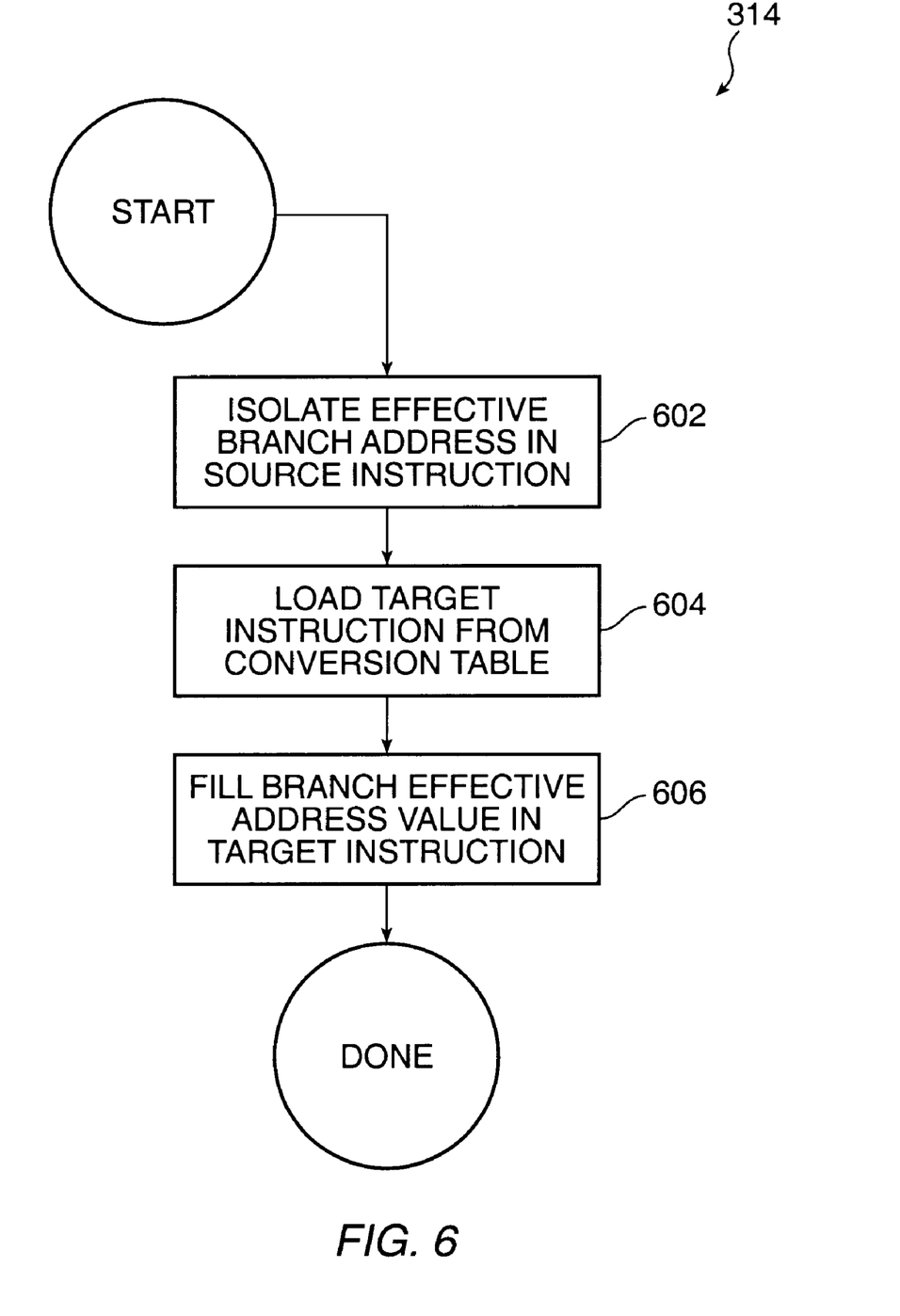
FIG. 6 is a flowchart which details the additional steps associated with converting a branch instruction from a source executable into a branch instruction for a target executable.

FIG. 6 is a flow chart which details the additional steps associated with converting a branch instruction associated with a source executable at step 314 (FIG. 3) into a branch instruction for the target executable. The process for converting branch instructions is similar to the process used above for converting memory instructions except that the branch instruction usually references a memory location where another instruction is located rather than where only data is located. Accordingly, a branch instruction is used to transfer control from one instruction in a program to another instruction in a program located at a particular effective memory address.

Initially, step 602 in FIG. 6 isolates one or more memory addresses used in a branch instruction found in the source executable. Generally, memory addresses used by the branch instruction on the source processor do not correspond to memory addresses used by branch instructions on the target processor. For this reason, step 602 involves looking up the specific opcode in an instruction table associated with the source processor and then using this instruction format information to extract appropriate memory addresses from the branch instruction. If an indexed memory instruction is being used, this memory location value is translated into an effective address or real address in memory. In one embodiment, this is performed by summing the address in the source instruction with value stored in an index register. Those skilled in the art also understand that the effective address for a branch instruction may have to be adjusted depending on numerous factors such as the number of instructions in the target executable as compared with the source executable and any other factor which may affect the location of the branch address in the target executable program. The effective memory address is used later to generate the corresponding branch address in the target instruction.

Next, step 604 locates one or more target instructions associated with the target processor which corresponds to the branch instruction for the source processor found in step 314 (FIG. 3). In one embodiment, step 604 looks up the branch instruction for the source processor in the conversion table previously discussed above. Next, step 604 replaces the branch instruction for the source processor with one or more appropriate target instructions as indicated by the conversion table. At step 606, the branch target instructions are completed by inserting the effective memory addresses isolated in step 602 into the appropriate parameter locations.

The present invention offers several advantages in generating an executable program which were previously unavailable in the art. For benchmarking, embodiments of the present invention enables a user to execute substantially similar executable benchmarks on a wide variety of platforms. Instead of recompiling and optimizing the original benchmark code, the present invention recreates the executable version of a benchmark by substituting low level assembly or machine code in the original executable with the low level assembly or machine code instructions corresponding to a different processor. Executing a consistent benchmark across different platforms enables a user to compare the processing power of the underlying hardware rather than the efficiency of code as generated by a compiler. Consequently, performance comparisons made between different computer platforms are more reliable and can be used to select the appropriate computing platform.

Generally, this technique is also useful for generating other executables in a heterogeneous computing environment. Software developers can provide their applications on a wide variety of platforms without recompiling the original code on each different platform. This saves the developer time on porting and maintaining the application on many different hardware platforms. The users also benefit because they do not have to purchase different versions of software for each different platform. Provided the users have the proper licenses, users can use the present invention to generate many different executables depending on the target platform.

While specific embodiments have been described herein for purposes of illustration, various modifications may be made without departing from the spirit and scope of the invention. Those skilled in the art understand that the present invention can be implemented in a wide variety of compiler and interpreter technologies and is not limited to computer systems executing the compilers used for the SPARC architecture. Substantially similar alternative embodiments can be implemented except that the conversion techniques are adapted to work with Java Bytecodes for the Java Virtual Machine, executables for the Java line of processors such as the PicoJava, NanoJava, MicroJava, and UltraJava architectures or the PowerPC processor available from Apple, Inc. of Cupertino, Calif., or any of the Pentium or x86 compatible processors available from the Intel Corporation or other corporations such as AMD, and Cyrix. Accordingly, the invention is not limited to the above described embodiments, but instead is defined by the appended claims in light of their full scope of equivalents.

What is claimed is:

1. A method executed on a computer for converting a source executable code generated for execution on a source processor into a target executable code for execution on a target processor, the method comprising:

selecting a source instruction from the source executable code having an opcode and one or more corresponding parameters;

isolating one or more corresponding parameters provided in the source instruction based upon the source instruction opcode by determining the parameter values associated with registers if the source instruction is an arithmetic type operation; and generating the one or more target instructions associated with the target processor by filling the one or more parameters isolated from the source instruction into the corresponding parameters within the one or more target instructions.

2. A method executed on a computer for converting a source executable code generated for execution on a source processor into a target executable code for execution on a target processor, the method comprising:

selecting a source instruction from the source executable code having an opcode and one or more corresponding parameters;

isolating one or more corresponding parameters provided in the source instruction based upon the source instruction opcode by determining the parameter values associated with one or more effective addresses if the source instruction is a memory type operation; and generating the one or more target instructions associated with the target processor by filling the one or more parameters isolated from the source instruction into the corresponding parameters within the one or more target instructions.

3. A method executed on a computer for converting a source executable code generated for execution on a source processor into a target executable code for execution on a target processor, the method comprising:

selecting a source instruction from the source executable code having an opcode and one or more corresponding parameters;

isolating one or more corresponding parameters provided in the source instruction based upon the source instruction opcode by determining the parameter values associated with one or more branch addresses if the source instruction is a branch type instruction; and generating the one or more target instructions associated with the target processor by filling the one or more parameters isolated from the source instruction into the corresponding parameters within the one or more target instructions.

4. A method executed on a computer for converting a source executable code generated for execution on a source processor into a target executable code for execution on a target processor, the method comprising:

selecting a source instruction from the source executable code having an opcode and one or more corresponding parameters;

isolating one or more corresponding parameters provided in the source instruction based upon the source instruction opcode;

generating the one or more target instructions associated with the target processor by filling the one or more parameters isolated from the source instruction into the corresponding parameters within the one or more target instructions;

creating a conversion table which maps each source instruction associated with the source processor to one or more target instructions associated with the target processor, by categorizing each instruction associated with the source processor into a predetermined set of categories as selected from among arithmetic, memory, and branch instructions;

linking each instruction associated with the source processor to one or more target instructions associated with the target processor which perform functionally equivalent operations;

locating the selected source instruction in the conversion table based upon the opcode portion in the selected source instruction; and mapping the selected source instruction into one or more target instructions based upon the association between the source instructions and target instructions in the conversion table.

5. A computer apparatus configured to convert a source executable code generated for execution on a source processor into a target executable code for execution on a target processor, comprising:

a mechanism configured to operate on each instruction in the source executable code using the following elements:

a mechanism configured to select a source instruction from the source executable code having an opcode and one or more corresponding parameters;

a mechanism configured to isolate one or more corresponding parameters provided in the source instruction based upon the source instruction opcode by determining the parameter values associated with one or more registers if the source instruction is an arithmetic instruction;

a mechanism configured to locate one or more target instructions associated with the second processor corresponding to the source instruction;

a mechanism configured to generate the one or more target instructions by filling the one or more parameters isolated from the source instruction into the corresponding parameters within the one or more target instructions.

6. A computer apparatus configured to convert a source executable code generated for execution on a source processor into a target executable code for execution on a target processor, comprising:

a mechanism configured to operate on each instruction in the source executable code using the following elements:

a mechanism configured to select a source instruction from the source executable code having an opcode and one or more corresponding parameters;

a mechanism configured to isolate one or more corresponding parameters provided in the source instruction based upon the source instruction opcode by determining the parameter values associated with one or more effective addresses if the source instruction is a memory type instruction;

a mechanism configured to locate one or more target instructions associated with the second processor corresponding to the source instruction;

a mechanism configured to generate the one or more target instructions by filling the one or more parameters isolated from the source instruction into the corresponding parameters within the one or more target instructions.

7. A computer apparatus configured to convert a source executable code generated for execution on a source processor into a target executable code for execution on a target processor, comprising:

a mechanism configured to operate on each instruction in the source executable code using the following elements:

a mechanism configured to select a source instruction from the source executable code having an opcode and one or more corresponding parameters;

a mechanism configured to isolate one or more corresponding parameters provided in the source instruction based upon the source instruction opcode by determining the parameter values associated with one or more effective branch addresses if the source instruction is a branch type instruction;

a mechanism configured to locate one or more target instructions associated with the second processor corresponding to the source instruction;

a mechanism configured to generate the one or more target instructions by filling the one or more parameters isolated from the source instruction into the corresponding parameters within the one or more target instructions.

8. A computer apparatus configured to convert a source executable code generated for execution on a source processor into a target executable code for execution on a target processor, comprising:

a mechanism configured to operate on each instruction in the source executable code using the following elements:

a mechanism configured to select a source instruction from the source executable code having an opcode and one or more corresponding parameters;

a mechanism configured to isolate one or more corresponding parameters provided in the source instruction based upon the source instruction opcode;

a mechanism configured to locate one or more target instructions associated with the second processor corresponding to the source instruction, the mechanism comprising a conversion table which maps each source instruction associated with the source processor to one or more target instructions associated with the target processor by categorizing each instruction associated with the source processor into a predetermined set of categories as selected from arithmetic, memory, and branch instructions and linking each instruction associated with the source processor to one or more target instructions associated with the target processor which perform functionally equivalent operations;

a mechanism configured to locate the selected source instruction in the conversion table based upon the opcode portion in the selected source instruction, and a mechanism configured to map the selected source instruction into one or more target instructions based upon the association between the source instructions and target instructions in the conversion table;

a mechanism configured to generate the one or more target instructions by filling the one or more parameters isolated from the source instruction into the corresponding parameters within the one or more target instructions.

9. A computer apparatus embedded into a computer system located on a network which facilitates communication between a server and one or more client computers coupled to the network, the apparatus being configured to convert a source executable code generated for execution on a source processor into a target executable code for execution on a target processor, the apparatus comprising:

a mechanism configured to operate on each instruction in the source executable code using the following elements:

a mechanism configured to select a source instruction from the source executable code having an opcode and one or more corresponding parameters;

a mechanism configured to isolate one or more corresponding parameters provided in the source instruction based upon the source instruction opcode;

a mechanism configured to locate one or more target instructions associated with the second processor corresponding to the source instruction;

a mechanism configured to generate the one or more target instructions by filling the one or more parameters isolated from the source instruction into the corresponding parameters within the one or more target instructions.

10. The computer apparatus of claim 9 wherein said computer system is a client computer system.

11. A computer program product comprising:

a computer usable medium having computer readable code embodied therein configured to convert a source executable code generated for execution on a source processor into target executable code for execution on a target processor, comprising:

a first code configured to operate on each instruction in the source executable code using the following code:

a second code configured to select a source instruction from the source executable code having an opcode and one or more corresponding parameters;

a third code configured to isolate the one or more parameters provided in the source instruction based upon the source instruction opcode by determining the parameter values associated with one or more registers if the source instruction is an arithmetic type instruction;

a fourth code configured to locate one or more target instructions associated with the second processor corresponding to the source instruction;

a fifth code configured to generate the one or more target instructions by filling the one or more parameters isolated from the source instruction into the corresponding parameters within the one or more target instructions.

12. A computer program product comprising:

a computer usable medium having computer readable code embodied therein configured to convert a source executable code generated for execution on a source processor into target executable code for execution on a target processor, comprising:

a first code configured to operate on each instruction in the source executable code using the following code:

a second code configured to select a source instruction from the source executable code having an opcode and one or more corresponding parameters;

a third code configured to isolate the one or more parameters provided in the source instruction based upon the source instruction opcode by determining the parameter values associated with one or more effective addresses if the source instruction is an memory type instruction;

a fourth code configured to locate one or more target instructions associated with the second processor corresponding to the source instruction;

a fifth code configured to generate the one or more target instructions by filling the one or more parameters isolated from the source instruction into the corresponding parameters within the one or more target instructions.

13. A computer program product comprising:

a computer usable medium having computer readable code embodied therein configured to convert a source executable code generated for execution on a source processor into target executable code for execution on a target processor, comprising:

a first code configured to operate on each instruction in the source executable code using the following code:

a second code configured to select a source instruction from the source executable code having an opcode and one or more corresponding parameters;

a third code configured to isolate the one or more parameters provided in the source instruction based upon the source instruction opcode by determining the parameter values associated with one or more branch addresses if the source instruction is a branch type instruction;

a fourth code configured to locate one or more target instructions associated with the second processor corresponding to the source instruction;

a fifth code configured to generate the one or more target instructions by filling the one or more parameters isolated from the source instruction into the corresponding parameters within the one or more target instructions.

14. A computer program product comprising:

a computer usable medium having computer readable code embodied therein configured to convert a source executable code generated for execution on a source processor into target executable code for execution on a target processor, comprising:

a first code configured to operate on each instruction in the source executable code using the following code:

a second code configured to select a source instruction from the source executable code having an opcode and one or more corresponding parameters;

a third code configured to isolate the one or more parameters provided in the source instruction based upon the source instruction opcode;

a fourth code configured to locate one or more target instructions associated with the second processor corresponding to the source instruction comprising a sixth code configured to generate a conversion table which maps each source instruction associated with the source processor to one or more target instructions associated with the target processor, the sixth code comprising a ninth code configured to categorize each instruction associated with the source processor into a predetermined set of categories as selected from among arithmetic, memory, and branch instructions; and a tenth code configured to link each instruction associated with the source processor to one or more target instructions associated with the target processor which perform functionally equivalent operations;

a seventh code configured to locate the selected source instruction in the conversion table based upon the opcode portion in the selected source instruction; and an eighth code configured to map the selected source instruction into one or more target instructions based upon the association between the source instructions and target instructions in the conversion table;

a fifth code configured to generate the one or more target instructions by filling the one or more parameters isolated from the source instruction into the corresponding parameters within the one or more target instructions.

15. A computer program product embedded into a first computer system which is coupled to a network which facilitates communication between the first computer system and one or more second computer systems the program product comprising:

a computer usable medium having computer readable code embodied therein configured to convert a source executable code generated for execution on a source processor into target executable code for execution on a target processor, comprising:

a first code configured to operate on each instruction in the source executable code using the following code:

a second code configured to select a source instruction from the source executable code having an opcode and one or more corresponding parameters;

a third code configured to isolate the one or more parameters provided in the source instruction based upon the source instruction opcode by determining the parameter values associated with one or more registers if the source instruction is an arithmetic type instruction;

a fourth code configured to locate one or more target instructions associated with the second processor corresponding to the source instruction;

a fifth code configured to generate the one or more target instructions by filling the one or more parameters isolated from the source instruction into the corresponding parameters within the one or more target instructions.

16. The code in claim 15 wherein said first computer system is a client computer system, and said one or more second computer systems are further defined as comprising one or more server computer systems.

17. The computer apparatus of claim 9 wherein said computer system is a server computer system.

18. The code in claim 15 wherein said first computer system is a server computer system, and said one or more second computer systems are further defined as one or more client computer systems.

* * * * *